(12) United States Patent
Minemura

(10) Patent No.: US 8,873,360 B2
(45) Date of Patent: Oct. 28, 2014

(54) LIBRARY APPARATUS

(71) Applicant: Fujitsu Limited, Kawasaki (JP)

(72) Inventor: Tsukasa Minemura, Nagano (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/856,490

(22) Filed: Apr. 4, 2013

(65) Prior Publication Data

US 2013/0322223 A1    Dec. 5, 2013

(30) Foreign Application Priority Data

May 30, 2012   (JP) ................. 2012-123231

(51) Int. Cl.
*G11B 33/04* (2006.01)
*G11B 15/68* (2006.01)
*G11B 17/22* (2006.01)

(52) U.S. Cl.
CPC ............ *G11B 33/04* (2013.01); *G11B 15/6835* (2013.01); *G11B 17/225* (2013.01)
USPC ..................................... 369/75.11

(58) Field of Classification Search
USPC ................ 369/75.11; 710/2, 15, 18; 720/632; 360/92.1
See application file for complete search history.

(56) References Cited

U.S. PATENT DOCUMENTS

| | | | |
|---|---|---|---|
| 4,817,071 A * | 3/1989 | Carlson et al. | 369/30.6 |
| 5,277,534 A * | 1/1994 | Anderson et al. | 414/281 |
| 6,011,669 A * | 1/2000 | Apple et al. | 360/92.1 |
| 6,438,623 B1 | 8/2002 | Ryan | |
| 6,457,928 B1 * | 10/2002 | Ryan | 414/281 |
| 6,494,663 B2 * | 12/2002 | Ostwald et al. | 414/281 |
| 6,648,574 B2 | 11/2003 | Williams | |
| 6,661,602 B2 * | 12/2003 | Benson et al. | 360/92.1 |
| 7,021,883 B1 * | 4/2006 | Plutt et al. | 414/277 |
| 7,102,849 B2 * | 9/2006 | Donkin et al. | 360/92.1 |
| 7,199,967 B2 * | 4/2007 | Benson et al. | 360/96.4 |
| 7,486,472 B2 * | 2/2009 | Pollard et al. | 360/92.1 |
| 2006/0092551 A1 | 5/2006 | Iwata | |
| 2010/0198395 A1 | 8/2010 | Sasaki | |

FOREIGN PATENT DOCUMENTS

| | | |
|---|---|---|
| DE | 102007056794 A1 | 6/2009 |
| EP | 0982724 A2 | 3/2000 |

(Continued)

OTHER PUBLICATIONS

Extended European Search Report dated Oct. 2, 2013 for corresponding European Application No. 13161618.7.

(Continued)

*Primary Examiner* — Angel Castro
(74) *Attorney, Agent, or Firm* — Fujitsu Patent Center

(57) ABSTRACT

A library apparatus which can be used alone and which, when linked, enables conveyance of a cartridge between linked library apparatuses by minor remodeling, that is, a library apparatus which is provided in a cabinet with first to third storage racks which can store a plurality of recording media, a drive of the cartridges, and a robot which conveys a cartridge between the first to third storage racks and the drive by an instruction from a control device, wherein when expanding the capacity by providing another library apparatus of the same specifications as the library apparatus, part of the first storage rack which is at the back side at the same height from the set surface of the cabinet is replaced with a track member which passes between the cabinets, and a moving member which can convey a cartridge is provided on the track member.

19 Claims, 16 Drawing Sheets

(56) References Cited

FOREIGN PATENT DOCUMENTS

| | | |
|---|---|---|
| JP | 62-42210 | 2/1987 |
| JP | 5-189850 A | 7/1993 |
| JP | 06-203443 | 7/1994 |
| JP | 10-162472 A | 6/1998 |
| JP | 2006-127628 | 5/2006 |
| WO | WO 2009/050792 | 4/2009 |

OTHER PUBLICATIONS

Korean Office Action mailed May 1, 2014 for corresponding Korean Application No. 10-2013-46970, with English Translation, 7 pages.

* cited by examiner

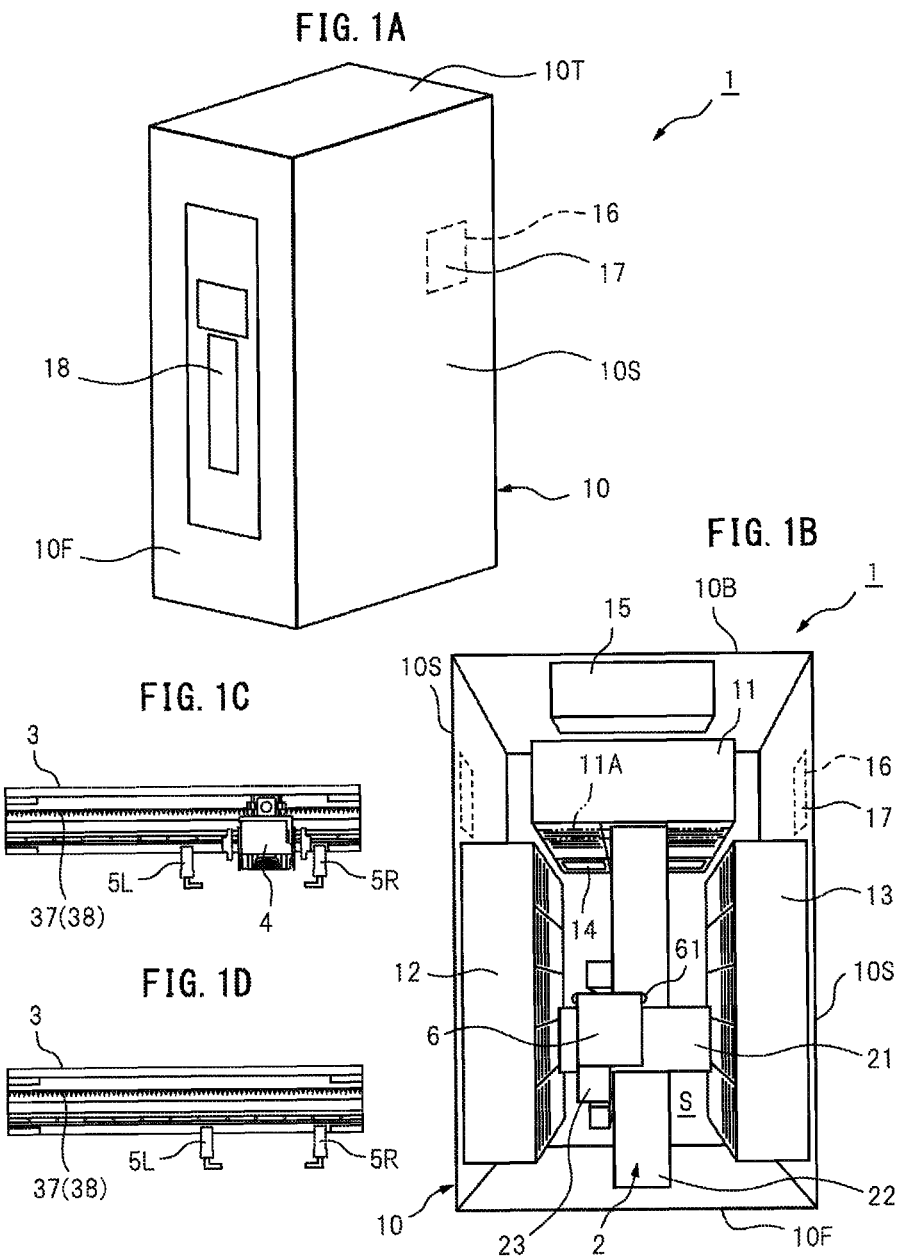

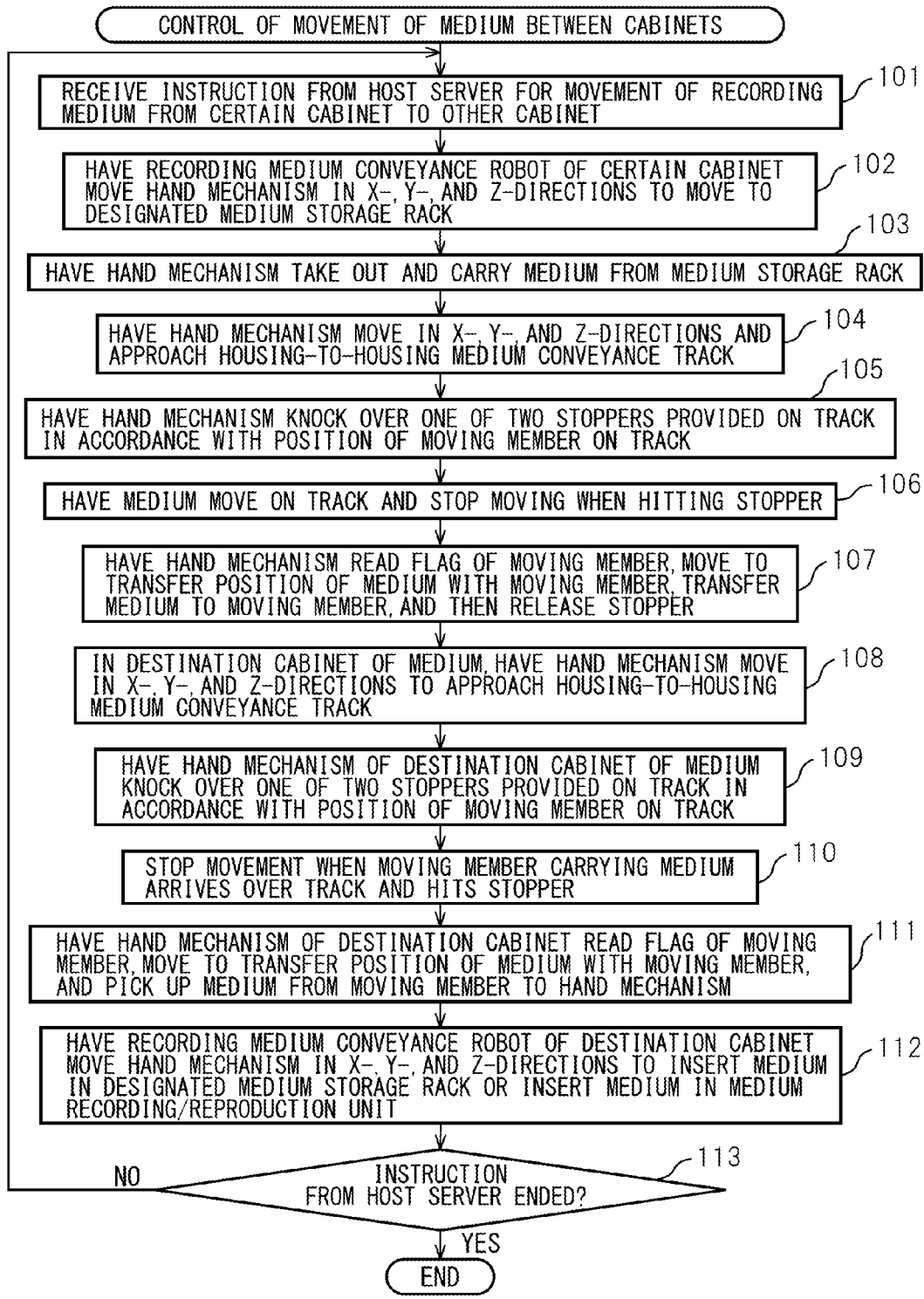

LIBRARY APPARATUS

CROSS-REFERENCE TO RELATED APPLICATION

This application claims priority from, and incorporates by reference the entire disclosure of, Japanese Patent Application No. 2012-123231, filed on May 30, 2012.

FIELD

The present application relates to a library apparatus which increases storage by linkage.

BACKGROUND

In the past, as a large capacity external storage device which is used connected to a large-sized computer apparatus, a library apparatus has been known. A library apparatus is provided with medium storage racks which are provided with cells which hold cartridges in which magnetic tape media are contained and uses a conveyance robot which is provided inside the apparatus to convey cartridges to a tape drive so as to read or write data with respect to the tape media. In recent years, there have also been library apparatuses which are provided with pluralities of tape drives and library apparatuses which are provided with optical disk drives. Such library apparatuses are, for example, disclosed in Japanese Laid-Open Patent Publication No. 2006-127628.

A library apparatus has a fixed number of cartridges which it can store inside of it. Therefore, there are library apparatus which are designed to store cartridges in magazines and enable exchange of magazines so as change the cartridges which are contained. Further, in Japanese Laid-Open Patent Publication No. 2006-127628, two library apparatuses are stacked one on top of the other and a pass through mechanism is used to enable cartridges to be moved between the top level and bottom level library apparatuses.

SUMMARY

In this regard, if the number of cartridges which are to be stored in an apparatus were to increase several fold for example, a general tape library apparatus would not be able to handle the increase. That is, it is not possible to increase by several fold the number of cartridges stored in a tape library apparatus with a fixed storable number of cartridges so as to change it to a large capacity tape library apparatus. Like in the library apparatus which is disclosed in Japanese Laid-Open Patent Publication No. 2006-127628, it may be considered to link a plurality of library apparatuses so as to increase the capacity. However, it is not easy to make robots move while conveying cartridges between linked library apparatuses. That is, even if it is easy to link two library apparatuses, it is not easy to link three or more. The reason is that the work for remodeling the robots in three or more linked library apparatuses takes effort. Further, when further increasing the number of cartridges held, remodeling the robot mechanisms for conveyance of the cartridges and raising the conveyance speed are difficult.

In one aspect, the present application has as its object the provision of a library apparatus which can be used even as an independent library apparatus and which, when linked, enables conveyance of cartridges between linked library apparatuses by just minor remodeling.

According to one aspect, the present application provides a library apparatus which is provided with a cabinet which has storage racks which are able to store a plurality of recording media and which can be linked with another cabinet by a conveyor device which conveys recording media between the cabinet and that other cabinet, the library apparatus being provided with a provisional storage rack which is provided at a storage position inside the cabinet where a conveyor device would be held when linked with the other cabinet and which can be detached from the cabinet and with opening parts which are provided at side surfaces of the cabinet which are positioned at the two sides of the provisional storage rack.

BRIEF DESCRIPTION OF DRAWINGS

FIG. 1A is a perspective view which illustrates the appearance of a library apparatus of the present application.

FIG. 1B is a bird's eye view which views the inside of the library apparatus which is illustrated in FIG. 1A after removing the top plate.

FIG. 1C is a plan view of a track member which replaces part of a first storage rack of a recording medium of the library apparatus which is illustrated in FIG. 1B and a moving member which is set on the track member.

FIG. 1D is a plan view of an expansion track member which links with the track member which is illustrated in FIG. 1C.

FIG. 10 is a flowchart which illustrates one example of the routine for control of movement of a medium between cabinets.

DESCRIPTION OF EMBODIMENTS

Figure 2B:
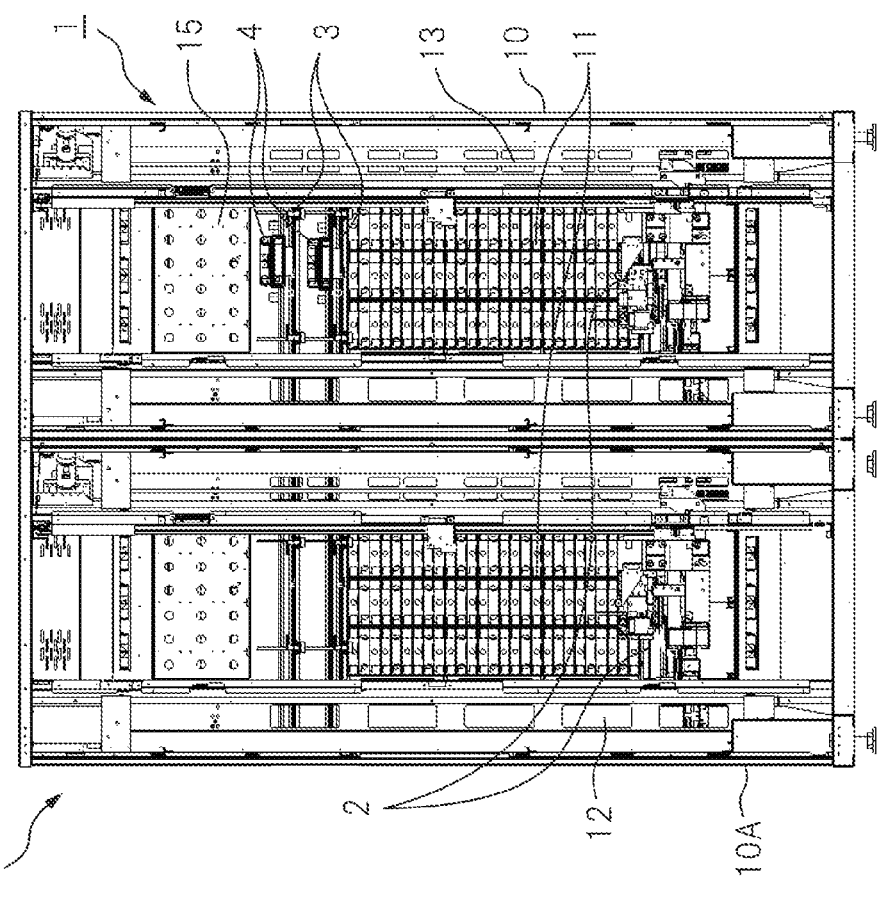
FIG. 2B is a front view which views from the front surface the library apparatus which is illustrated in FIG. 2A.

Below, the attached drawings will be used to explain in detail embodiments of the present application based on specific examples.

FIG. 1A is a perspective view which illustrates the appearance of an embodiment of library apparatus 1 of the present application. The housing of the library apparatus 1, that is, a cabinet 10, has a front panel 10F which has an operating part 18. At the side panels 10S, there are later explained opening parts 16 and lids 17 which cover the same. In the library apparatus 1, the operating part 18 is used to select, record on, and reproduce recording media which are stored in the cabinet 10, that is, cartridge tapes. In this embodiment, as the cartridge tapes, the case of use of LTO (Linear Tape Open) cartridge tapes will be explained. LTO cartridge tapes have housings in which magnetic tapes are wound around reel hubs. Leader pins which are attached to the front ends of the magnetic tapes are provided. The leader pins are used to pull out the tapes. LTO cartridges tapes are well known, so further explanation will be omitted here. LTO cartridges tape will be simply called "cartridges" after this.

FIG. 1B is a bird's eye view which views the inside of the cabinet 10 from above after removing the top plate 10T of the library apparatus 1 which is illustrated in FIG. 1A. Inside the cabinet 10, there are first to third storage racks 11 to 13 which can store pluralities of cartridges, cartridge drives 14, and a robot 2 which conveys cartridges between the storage racks 11 to 13 and the drive 14 by instruction from a control device 15. Inside the control device 15, a robot control board is housed. A fiber channel path is also equipped for interfacing with a host server. This fiber channel path may be used by the host server to control the operation of the robot. Information on the storage racks and cartridges can be output from the control device 15, a designated cartridge can be taken out from a storage rack by the robot 2, and the taken out cartridge can be inserted into a designated drive 14. Instructions for writing into the cartridge or for reading from the cartridge are also given from the host server. The drives 14 are cartridge recording/reproduction devices. In this embodiment, they are provided below the first storage rack 11.

The first storage rack 11 is set at the back panel 10B side of the cabinet 10, while the second and the third storage racks 12, 13 are set at the left and right side panel 10S sides of the cabinet 10. Further, the robot 2 is in the space which is surrounded by the first to third storage racks 11 to 13 and the front panel 10F. The robot 2 is provided with a hand mechanism 6 which picks up a cartridge from a predetermined location and stores it in the system, then, after conveyance, inserts the cartridge into a designated location. The robot 2 includes a left/right direction movement mechanism 21, a depth direction movement mechanism 22, and a top/down direction movement mechanism 23. The robot 2 can use these movement mechanisms 21 to 23 to make the hand mechanism 6 move inside the above-mentioned space S in the left/right directions, depth direction, and top/bottom directions so as to convey a cartridge.

At the first storage rack 11 of the library apparatus 1 of this embodiment, at the highest level part which is surrounded by the two-dot chain lines, a detachable provisional storage rack 11A is provided. Further, at the side panels 10S at the two sides at the same positions in the horizontal direction as this provisional storage rack 11A (positions of same heights from surface at which cabinet is set), opening parts 16 equal in cross-sectional shapes to the provisional storage rack 11A are provided. The opening parts 16 are usually covered by lids 17. In the library apparatus of this embodiment, if removing the provisional storage rack 11A and detaching the lids 17 which are provided at the side panels 10S at the two sides, a through path is formed from one side panel 10S to the other side panel 10S.

At this through path, a track member 3 for conveying a medium between housings which is illustrated in FIG. 1C and FIG. 1D (hereinafter simply referred to as a "track member") 3 can be attached. The track member 3 which is illustrated in FIG. 1C and FIG. 1D can be connected, and a moving member 4 which is able to hold and convey a cartridge can be made to run on the track member 3. Therefore, if arranging another library apparatus (not shown) of the same specifications as the library apparatus which is illustrated in FIG. 1B in parallel with it, removing the provisional storage racks 11A from the two library apparatuses, detaching the adjoining lids 17, and installing a track member 3, the two library apparatuses can be linked. In the linked library apparatuses, the robots 2 and the moving member 4 can be used to exchange cartridges at the two units.

That is, the library apparatus 1 of this embodiment enables the construction of a large capacity library apparatus by just installing a plurality of units in parallel, removing the adjoining lids 17, and replacing the provisional storage racks 11A with track members 3. At this time, the insertion opening for a cartridge in the moving member 4 which is made to move on the track member 3 is formed at the same position as the insertion openings for cartridges in the removed provisional storage racks 11A. For this reason, cartridges can be inserted into the moving member 4 by the robots 2 which are in the library apparatuses.

Further, after removing the provisional storage racks 11A, in this embodiment, it is possible to insert two levels of track members and construct a double cartridge conveyance path between the library apparatuses to realize a redundant configuration, but when a redundant configuration is not needed, a single level track member may be laid between the library apparatuses. Further, each of the track members 3 which are illustrated in FIG. 1C and FIG. 1D, while explained later, is provided with two mechanical stopping mechanisms 5L, 5R at a distance greater than the horizontal width of the hand mechanism 4. The mechanical stopping mechanisms 5L, 5R have sensors 38, attached to a gear part 37, for finely detecting the position of the moving member 4 on the track member 3. When the control device 15 can be used to precisely electronically control the position of the moving member 4, they are not necessary.

If removing the provisional storage racks 11A from the parallel installed plurality of library apparatuses, then connecting the track member 3 between the library apparatuses, the cartridges in each of the library apparatuses can be used at all of the library apparatuses. With this configuration, the number of cartridges which can be stored in linked library apparatuses becomes a whole multiple of the number of cartridges which can be held in each library apparatus (multiple of the number of parallel installed library apparatuses). On the other hand, if the frequency of use of cartridges in the linked library apparatuses is low, it is possible to replace the drives in predetermined library apparatuses with cartridge storage units of the same size to reduce their number and thereby increase the number of cartridges which can be stored in the linked library apparatuses.

Figure 2A:
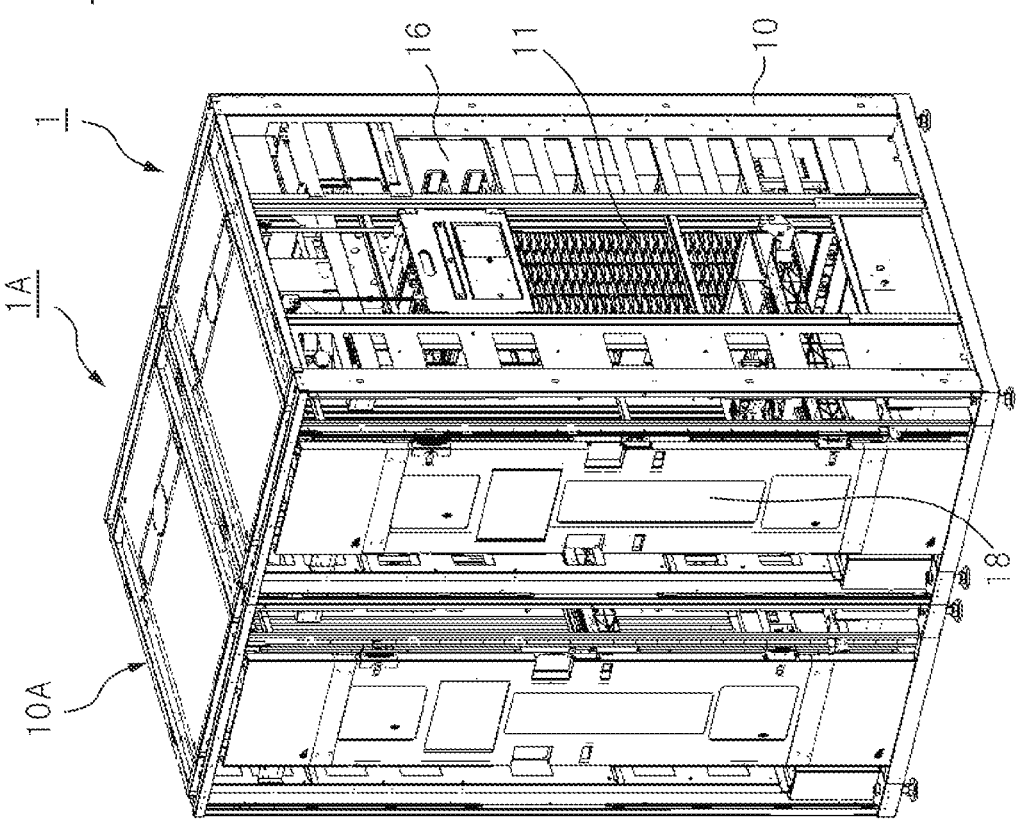
FIG. 2A is a perspective view which views from the front side the state of linking two library apparatuses of an embodiment of the present application.

Next, a specific example of a library apparatus in the present application will be explained. FIG. 2A is a perspective view seen from the front side of a state where a separate library apparatus 1A is placed next to a reference library apparatus 1 and the two apparatuses are linked. It illustrates the state with the outer covers removed. Further, FIG. 2B is a front view seen from the front surface of the library apparatuses 1, 1A which are illustrated in FIG. 2A with the operating parts 18 removed. Furthermore, FIG. 3 is a perspective view seen from the back side of the library apparatuses 1, 1A which are illustrated in FIG. 2A and FIG. 2B.

FIG. 2A illustrates the first storage rack 11 and the opening part 16 and operating part 18 in the first cabinet 10. Further, FIG. 2B illustrates the robots 2, track member 3, moving member 4, the first to third storage racks 11 to 13, and the control devices 15. Furthermore, FIG. 3 illustrates the track member 3, the control devices 15, and the opening parts 16.

Figure 3:
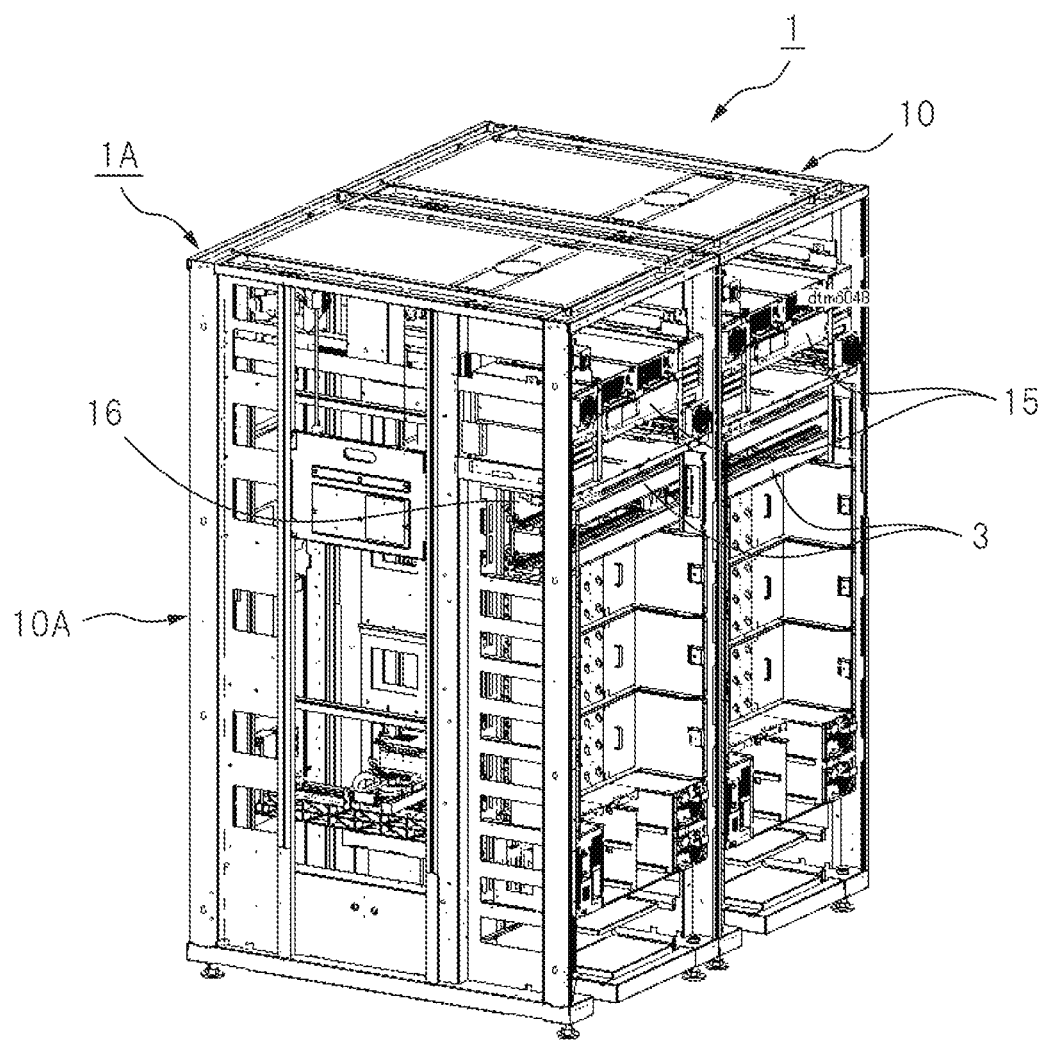
FIG. 3 is a perspective view which views from the back surface the state of linking two library apparatuses of an embodiment of the present application.
Figure 4:
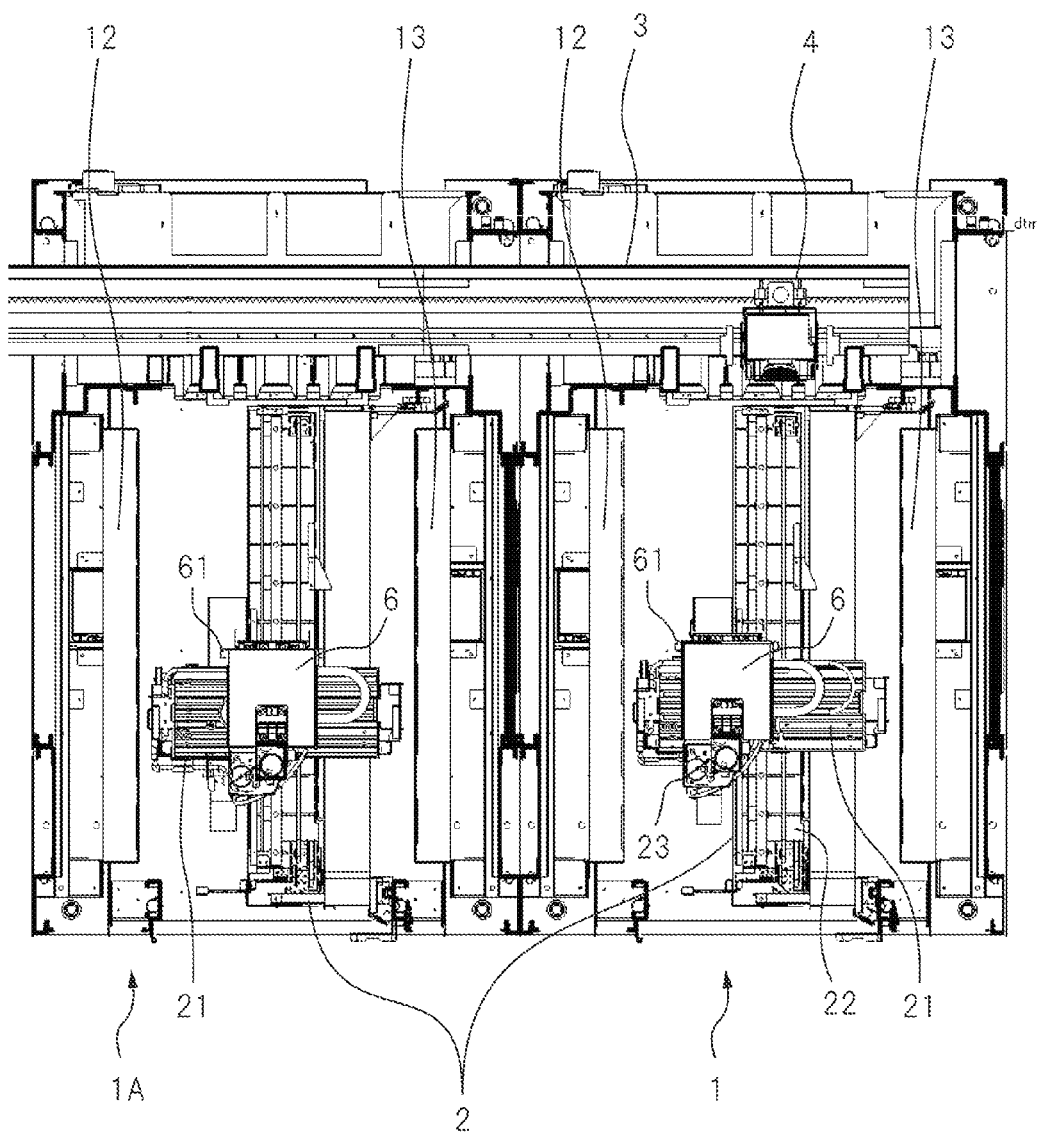
FIG. 4 is a plan view which views from above the state of linking two library apparatuses of an embodiment of the present application in the state with the top plate removed.

FIG. 4 is a plan view seen from above of the state of linking the library apparatuses 1, 1A which are illustrated in FIG. 2 and FIG. 3. A track member 3 which is connected to the positions of the first storage racks is attached. On the track member 3, a moving member 4 is provided. Each robot 2 is provided with a left/right direction movement mechanism 21 which makes the hand mechanism 6 move in a left/right direction, a depth direction movement mechanism 22 which makes the left/right direction movement mechanism 21 move in the depth direction, and an up/down movement mechanism 23 which makes these move up and down. In FIG. 4, the track member 3 sticks out from the side surface of the other library apparatus 1A, but when the number of linked library apparatuses is two, the track member 3 should be kept inside of the other library apparatus 1A. Such a library apparatus enables the number of track members which are connected to be increased in accordance with the increase in linked apparatuses.

Figure 5A:
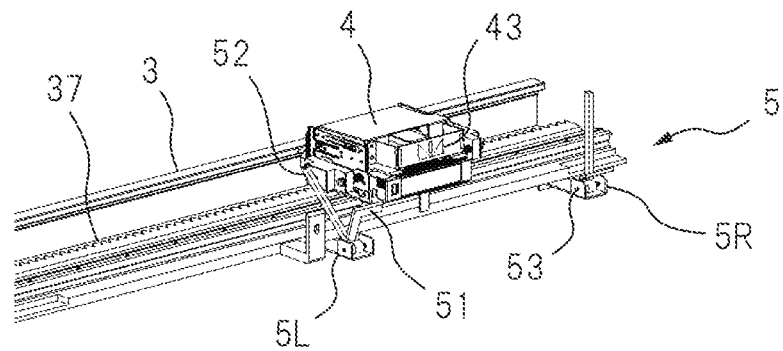
FIG. 5A is a perspective view which illustrates a track member for conveying a cartridge which is illustrated in FIG. 1C and a moving member on the track member.
Figure 5B:
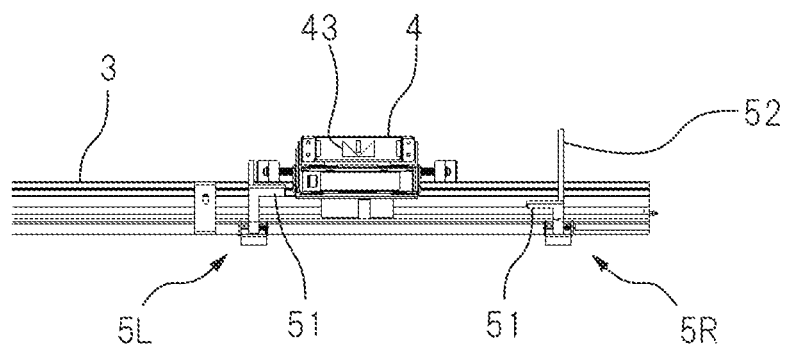
FIG. 5B is a front view of FIG. 5A.
Figure 5C:
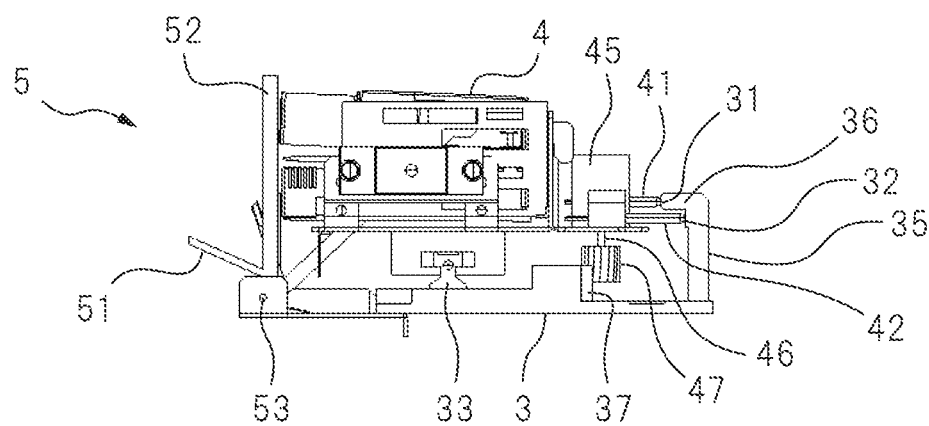
FIG. 5C is a side view of a moving member which is set on the track member.

FIG. 5A is a perspective view which illustrates a track member 3 which is illustrated in FIG. 1C and a moving member 4 and stopping mechanism 5 on the track member 3, FIG. 5B is a front view of FIG. 5A, and FIG. 5C is a side view of a moving member 4 which is set on the track member 3. The stopping mechanism 5 is provided with a left side stopping mechanism 5L and a right side stopping mechanism 5R. The left side stopping mechanism 5L and the right side stopping mechanism 5R are levers which are provided with receiving parts 51 and engaging parts 52 and are designed so that the engaging parts 52 turn to the track member 3 side by rotary shafts 53. The engaging parts 52 are stoppers which stop the moving member 4 from moving on the track member 3, so the engaging parts 52 will hereinafter be referred to as "stoppers 52".

In the state where the stoppers 52 do not rotate, as illustrated in FIG. 5C, there is a stopper 52 at the outside of the region where the moving member 4 moves on the track member 3, so the stopper 52 does not block the advancing path of the moving member 4. This is so as to not block the advancing path of the moving member 4 due to a plurality of track members 3 being connected. The moving member 4 moves along a rail 33 which is provided at the track member 3. The drive source is a drive device 45 which is attached to the moving member 4. The drive device 45 is a motor, so hereinafter the drive device 45 will be referred to as the "motor 45". At a rotating shaft 46 of the motor 45, a gear (pinion) 47 is attached. This gear 47 engages with a gear part (rack) 37 which is formed on the track member 3. Accordingly, if the motor 45 is energized, the gear 47 rotates and the moving member 4 moves on the rail 33.

At the end of the track member 3 at the side opposite to the side where the stopping mechanism 5 is provided, first and second electrode plates 31, 32 which supply power to the motor 45 are provided. Further, at the moving member 4 side, first and second current collectors 41, 42 which contact the first and second electrode plates 31, 32 are provided as power acquiring members. The power feed members to the moving member 4 are made the electrode plates 31, 32 considering the connection of track members 3. On the other hand, in general, if a current collector moves while contacting an electrode plate, wear debris (copper debris) will drop down from the contact part and stick to the contact par between the other electrode plate and current collector and will oxidize to thereby cause a drop in voltage or other adverse effects.

Therefore, in this embodiment, the tip of the electrode setting wall 35 which is provided at the end of the track member 3 is bent in the horizontal direction to form an overhang part 36, while the first electrode plate 31 is attached to the tip of the overhang part 36. Further, the second electrode plate 32 is arranged at the inside surface of the electrode setting wall 35 at the position of the base part of the overhang part 36. Therefore, the first and second electrode plates 31, 32 do not overlap in the plan view. For this reason, even if wear debris which is produced by contact of the first electrode plate 31 and the first current collector 41 drops downward, they will not affect the contact part of the second electrode plate 32 and the second current collector 42 as they are not positioned right under the contact part of the first electrode plates 31 and the first current collector 41. Further, the first and second electrode plates 31, 32 are connected so the electrical system need only consist of a single cable which supplies power from the control device to one location somewhere at the first and second electrode plates 31, 32. Therefore, elimination of cables is promoted.

Figure 6:
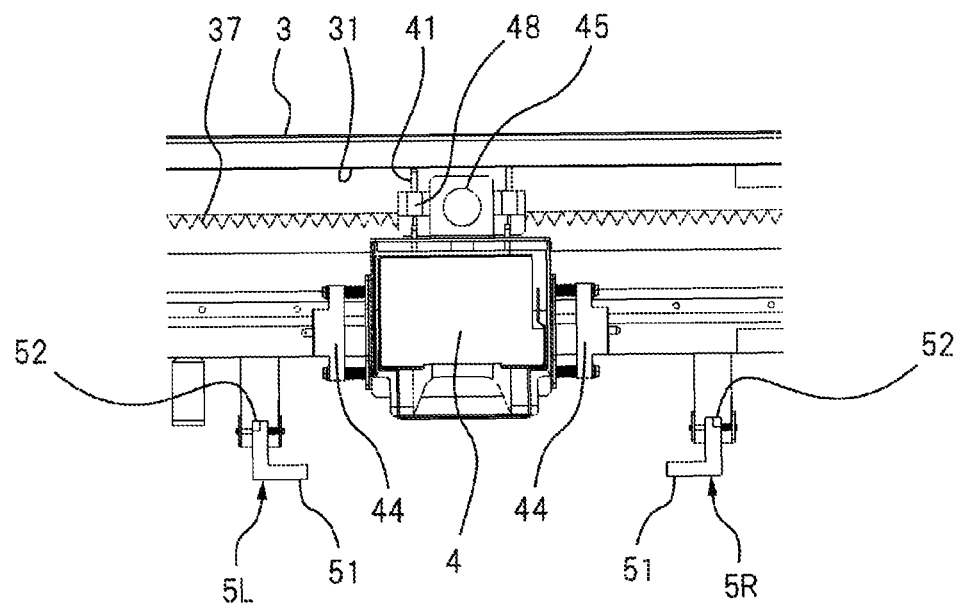
FIG. 6 is a plan view of a track member and a moving member which are illustrated from FIG. 5A to FIG. 5C.

FIG. 6 is a plan view which illustrates part of the track member and the moving member 4 which are illustrated from FIG. 5A to FIG. 5C. First current collectors 41 which are at the two sides of the motor 45 are pressed against the first electrode plate 31 at their tips by compressed spring parts 48. The second current collectors are hidden by the first current collectors 41 and are not visible, but like the first current collectors 41, their tips are pressed against the second electrode plate by compressed spring parts. Further, at the two ends of the moving member 4 in the movement direction, switches 44 are provided which cut off power to the motor 45 when abutting against the stoppers 51. These switches 44 are provided with buffer mechanisms which ease the shock when striking the stopper 51 of the stopping mechanism 5L or 5R on the track member 3. Reference numeral 37 is a gear with which the gear which is provided at the bottom side of the motor 45 meshes.

Figure 7:
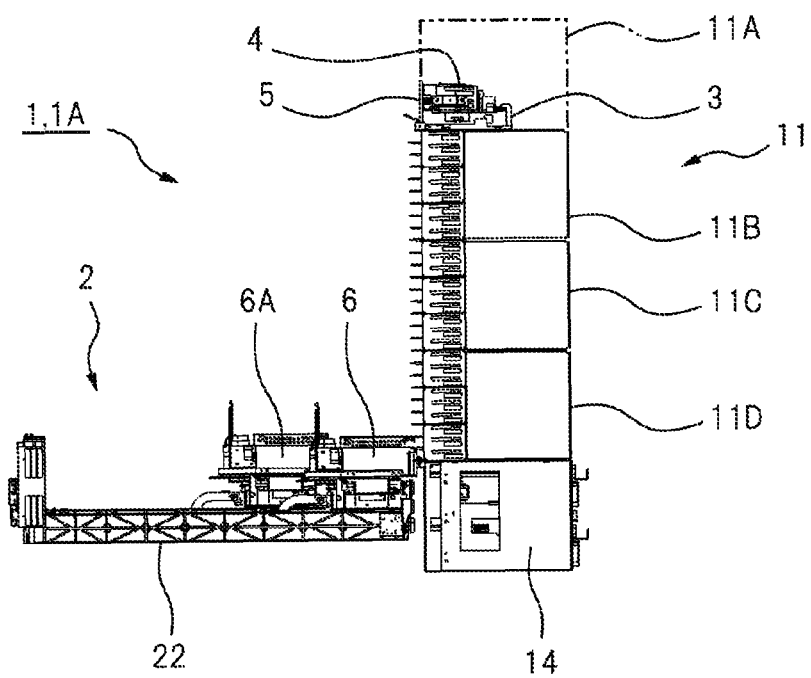
FIG. 7 is a side view which illustrates an embodiment of the configuration of a housing-to-housing medium conveying track member set at a part after removing a provisional storage rack from a first storage rack and a robot and hand mechanism in the library apparatus of the present application.

FIG. 7 is a side view which illustrates on embodiment of the configuration of track members 3 and moving members 4, 4A which are provided at a part from which the provisional storage rack 11A is removed from the first storage rack 11 in adjoining library apparatuses 1, 1A and a robot 2 and hand mechanism 6. From FIG. 7, it is learned that at the first storage rack 11, a drive 14 is set at the lowermost level and that the highest level provisional storage rack 11A is replaced by the track member 3. Further, FIG. 7 illustrates the state where the hand mechanisms 6, 6A at adjoining library apparatuses 1, 1A are at the same height positions. The hand mechanism 6, for example, approaches the first storage rack 11 by the depth direction movement mechanism 22 of the robot 2, picks up a cartridge from the lowest level storage unit 11D, and moves to the position of the moving member 4 by the not shown up/down direction movement mechanism of the robot 2.

Figure 8A:
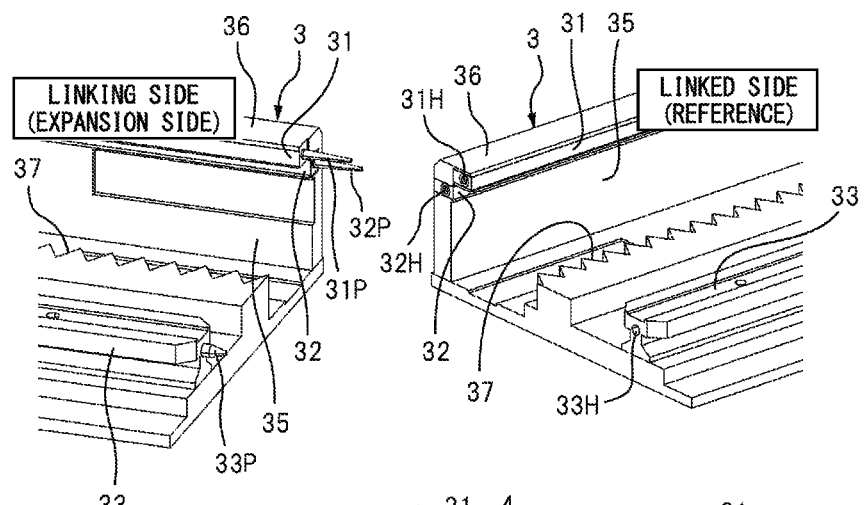
FIG. 8A is a partial perspective view which illustrates the configuration of ends of a track member which is illustrated in FIG. 1C and a track member which is illustrated in FIG. 1D.

FIG. 8A is a partial perspective view which illustrates the configuration of the ends of the track member 3 which is illustrated in FIG. 1C and the track member 3 which is illustrated in FIG. 1D. The end of the rail 33 of the track member 3 at the linked side (reference side) has a connecting hole 33H, while the rail 33 of the track member 3 at the linking side (expansion side) has a connecting pin 33P which is to be inserted into the connecting hole 33H. Further, the electrode setting wall 35 at the linked side (reference side) has a connecting hole 32H which is electrically connected to the second electrode plate 32, while the overhang part 36 has a connecting hole 31H which is electrically connected to the first electrode plate 31. Similarly, the electrode setting wall 35 at the linking side (expansion side) has a connecting pin 32P which is electrically connected to the second electrode plate 32, while the overhang part 36 has a connecting pin 31P which is electrically connected to the first electrode plate 31.

Figure 8B:
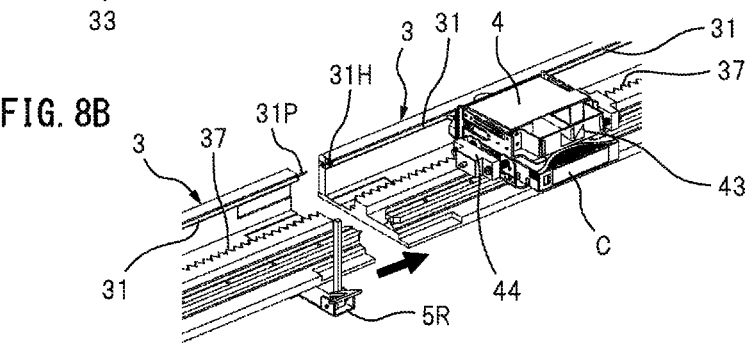
FIG. 8B is an assembled perspective view which illustrates the state of connecting the two track members which are illustrated in FIG. 8A.
Figure 8C:
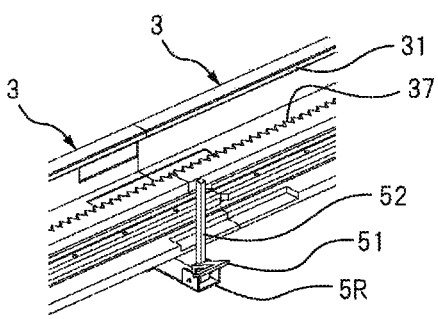
FIG. 8C is a partial perspective view which illustrates the state where two track members are connected from the state which is illustrated in FIG. 8B.

FIG. 8B is an assembled perspective view which illustrates the state of connecting the two track members 3 which are illustrated in FIG. 8A. When connecting two track members 3, the connecting pins 31P, 32P are inserted into the connecting holes 31H, 32H, so the electrode plates 31, 32 which are at the two track members 3 connected are electrically connected. FIG. 8C illustrates the state where two track members 3 are connected from the state which is illustrated in FIG. 8B.

Figure 9A:
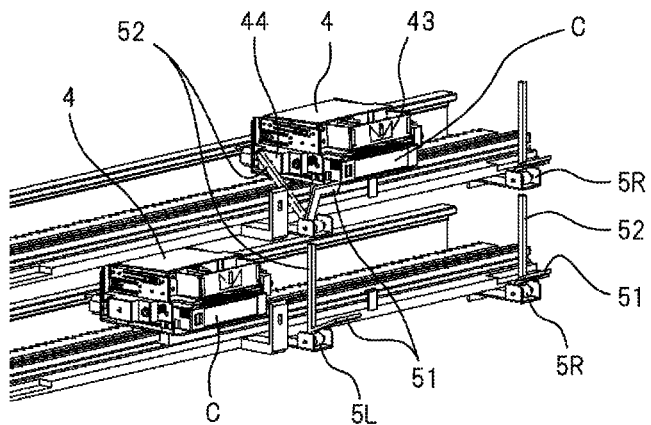
FIG. 9A is a perspective view which illustrates the state of forming a track member for conveying a cartridge which is illustrated in FIG. 1C and a moving member on the track member at two levels.
Figure 9B:
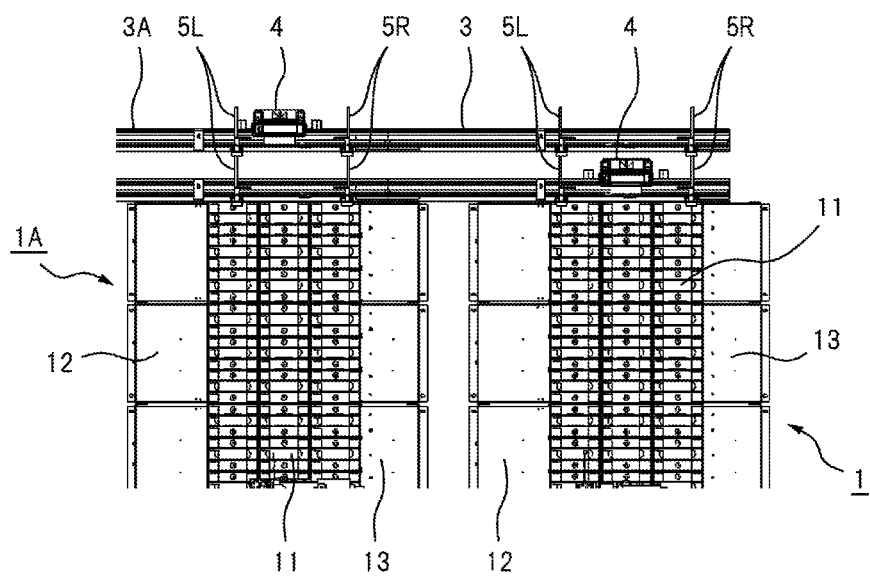
FIG. 9B is a partial front view of a library apparatus to which the two layers of track members which are illustrated in FIG. 9A are attached.

FIG. 9A is a perspective view which illustrates track members 3 and moving members 4 in the case of providing track members 3 which are illustrated in FIG. 1C in a two-level structure and setting them at the position of the detached provisional storage rack 11A. Further, FIG. 9B is a partial front view of the library apparatuses 1, 1A to which the two levels of track members 3 which are illustrated in FIG. 9A are attached. Track members 3 are provided in a two-level structure when the frequency of transfer of cartridges between parallel installed library apparatuses 1, 1A is large or when safety is a consideration and a redundant configuration is designed. In this way, after detaching the provisional storage rack 11A, it is possible to selectively provide either one level of a track member 3 or two levels of track members 3 in accordance with the stress on cost, redundancy, or stress on performance. When selecting redundancy by two levels of track members 3, either the top level or bottom level of the track members 3 becomes a retracted state and is switched to when some sort of trouble occurs in the operating side track member for conveyance between housings. On the other hand, when using two levels of track members 3 to stress performance, both the top level and bottom level operate to shorten the time for conveyance of cartridges between cabinets.

Above, an embodiment which sets two library apparatuses in parallel and connects them by track members was explained, but the number of connected library apparatuses is not limited. That is, if aligning the same specification library apparatuses to match the necessary number of stored cartridges, setting track members in the spaces formed by detaching the provisional storage racks and lids, and placing the moving members on them, any number of library apparatuses can be connected.

Next, one embodiment of control of movement of media (cartridges) between cabinets in a library apparatus configured as explained above will be explained in detail using the flow chart which is illustrated in FIG. 10 and the views for explaining the operations of the parts of the library apparatus which are illustrated in FIG. 11 to FIG. 25. Here, the explanation will be given assuming that a plurality of the library apparatuses are linked, assuming a cabinet from which a hand mechanism takes out a cartridge is "a certain cabinet", and assuming a cabinet to which the cartridge is transferred as a "destination cabinet". Further, in the following embodiment, instructions for movement of cartridges between cabinets are received from a host server, but it is also possible to have a specific library apparatus be able to instruct movement of cartridges. Furthermore, in the following embodiment, the housing-to-housing medium conveying tracks are provided in two levels. The hand mechanism handles the moving member and cartridges at the top side track for conveying media between housings.

At step 101, an instruction for moving a cartridge (in FIG. 10, described as a recording medium or medium) from a certain cabinet to another cabinet is received from the host server. At step 102, the recording medium conveyance robot of the certain cabinet makes the hand mechanism move in the X-, Y-, and Z-directions to make it move to the medium storage rack which is designated by the host server. Further, at step 103, the hand mechanism takes out the cartridge from the designated medium storage rack and places it on the hand mechanism.

Figure 11:
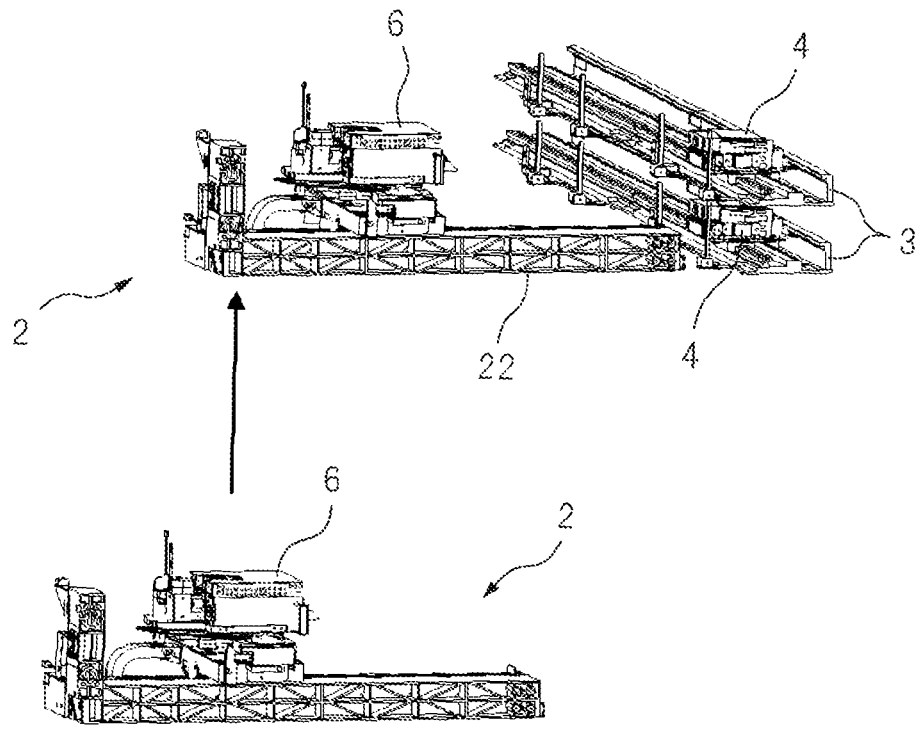
FIG. 11 is a perspective view which illustrates the operation of a magnetic recording medium conveyance robot in a certain cabinet making the hand mechanism rise.
Figure 12:
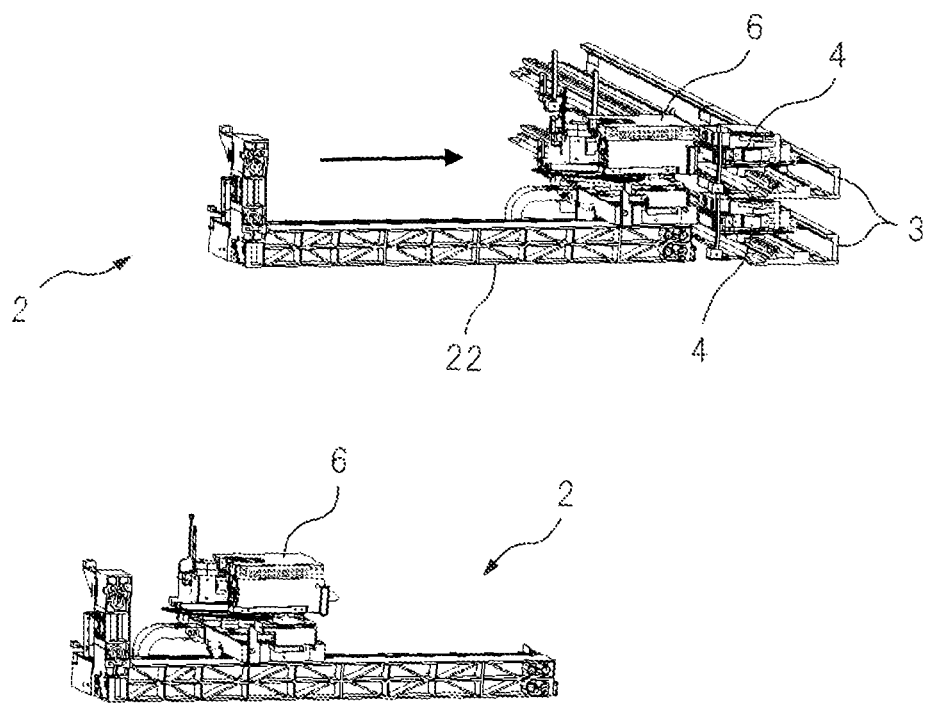
FIG. 12 is a perspective view which illustrate the operation of a magnetic recording medium conveyance robot in certain cabinet making the hand mechanism approach the track member for conveyance of a medium between housings.

At the next step 104, as illustrated in FIG. 11 and FIG. 12, the hand mechanism 6 moves in the horizontal direction, depth direction, and top/bottom direction (in FIG. 10, described as X-, Y-, and Z-directions) and approaches the housing-to-housing medium conveying track member (in FIG. 10, described as housing-to-housing medium conveying track) 3. FIG. 11 illustrates the state where the hand mechanism 6 which carries a cartridge is raised to the height of the housing-to-housing medium conveying track member 3 by the robot 2. FIG. 12 illustrates the state where the hand mechanism 6 which carries a cartridge is made to approach the housing-to-housing medium conveying track member 3 by the robot 2. Note that, the robot 2 and hand mechanism 6 which do not move in FIG. 11 and FIG. 12 illustrate the robot 2 and hand mechanism 6 in another cabinet.

Figure 13:
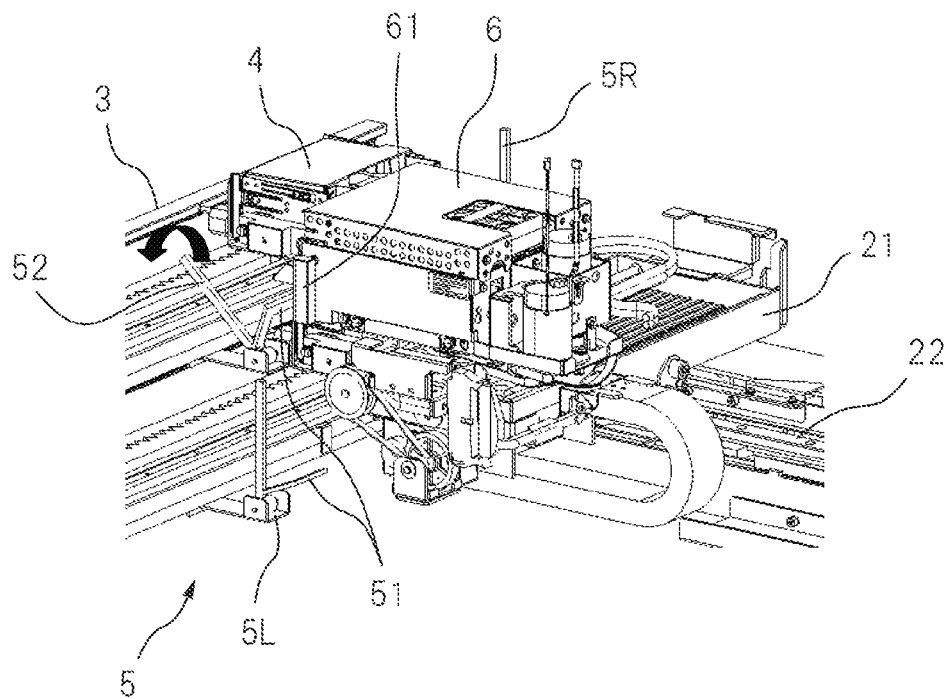
FIG. 13 is a perspective view which illustrate the operation of a magnetic recording medium conveyance robot in certain cabinet knocking over a stopper after making the hand mechanism approach the track member for conveying a medium between housings.

At step 105, as illustrated in FIG. 13, the hand mechanism 6 which approaches the housing-to-housing medium conveying track member 3 knocks over one of the two stopping mechanisms 5 which are provided on the track member 3 in accordance with the position of the moving member 4 on the track member (in FIG. 10, described as "track") 3. For example, when the moving member 4 is on the track member 3 at the right side from the hand mechanism 6, the left side stopping mechanism 5L among the two stopping mechanisms 5L, 5R is knocked over. As explained above, the distance between the left side stopping mechanism 5L and the right side stopping mechanism 5R is greater than the horizontal width of the hand mechanism 6. Therefore, when the hand mechanism 6 knocks over the left side stopping mechanism 5L, the hand mechanism 6 moves on the left/right direction movement mechanism 21 to the left side, then moves on the depth direction movement mechanism 22 to the track member 3 side and knocks over the left side stopping mechanism 5L. At the left side stopping mechanism 5L, there are a receiving part 51 and a stopper 52. The hand mechanism 6 uses the engaging part 61 which is provided projecting from the side surface to push the receiving part 51 to knock over the stopper 52.

Figure 14:
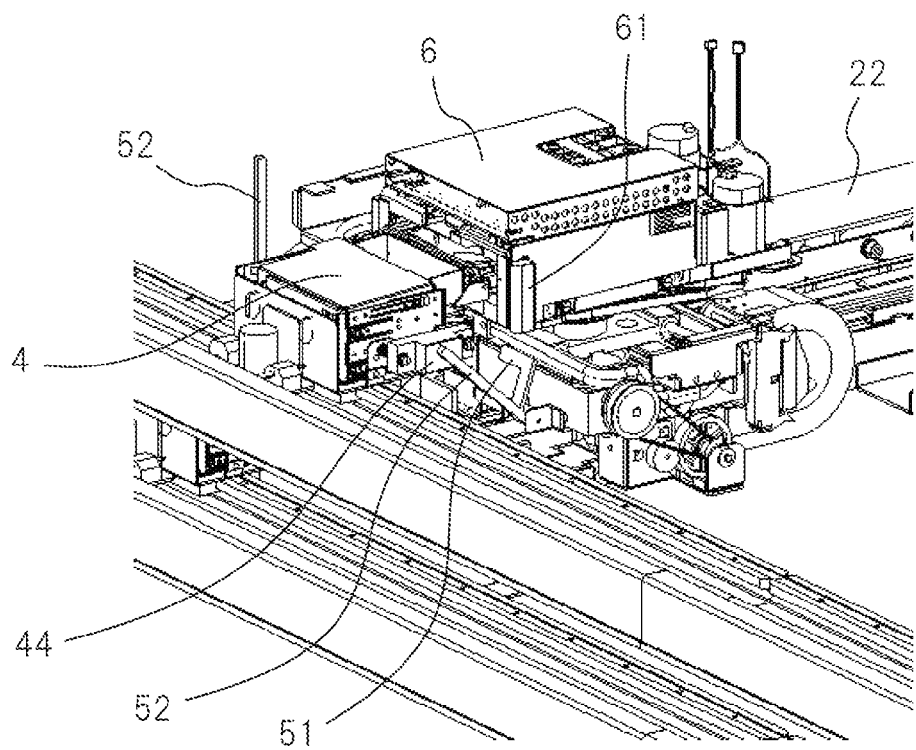
FIG. 14 is a perspective view which illustrates a state of a moving member on a housing-to-housing medium conveying track member moving, approaching a hand mechanism in a certain cabinet, and abutting against a stopper.
Figure 15:
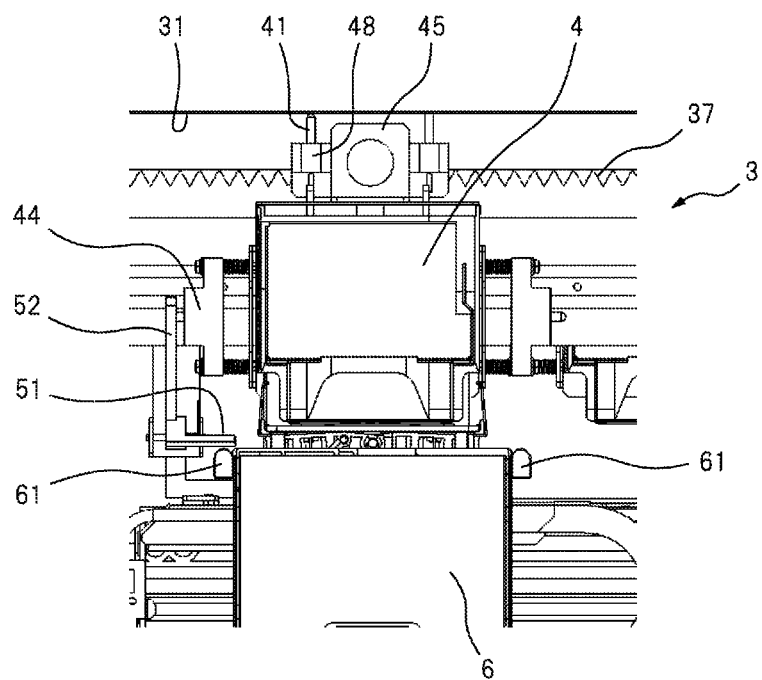
FIG. 15 is a plan view which illustrates part of FIG. 14 partially enlarged.

If the stopper 52 is knocked over and blocks the track member 3, step 106 is performed. As illustrated in FIG. 14, the moving member 4 arrives after moving on the track member 3 in the arrow direction. Further, as illustrated in FIG. 15, if the moving member 4 abuts against the stopper 52, the moving member 4 stops moving. The moving member 4 is moved by the control device 15 which is illustrated in FIG. 2B etc. electrifying the first electrode plate 31 and the second electrode plate 32 which are illustrated in FIG. 5C. The control device 15 determines the polarity of the drive voltage which is applied to the first electrode plate 31 and the second electrode plate 32 in accordance with the position of the moving member 4 on the track member 3 and the position of the stopper 52 knocked over on the track member 3. When the first electrode plate 31 and the second electrode plate 32 are electrified, the motor 45 which is connected to the power source through the current collectors 41, 42 turns and the moving member 4 moves in the direction of the knocked over stopper 52.

As illustrated in FIG. 15, at the two sides of the moving member 4 in the movement direction, switches 44 which are provided with buffer devices are provided. If a switch 44 is turned off, the circuit from the current collector 41 to the motor 45 is broken (the circuit from the current collector 31 to the motor 45 may also be broken). Further, if the moving member 4 moves and the switch 44 abuts against the stopper 52, the switch 44 turns off and the rotation of the motor 45 stops, so movement of the moving member 4 is stopped. After this, the control device 15 may be used to stop the feed of current to the first and second electrode plates 31, 32.

Figure 16:
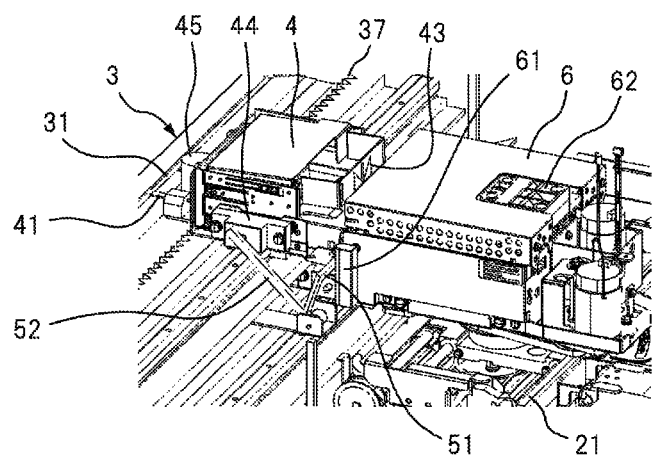
FIG. 16 is a perspective view which illustrates a state of a hand mechanism in a certain cabinet reading a flag at the moving member and moving to a transfer position of the medium with the moving member.
Figure 17:
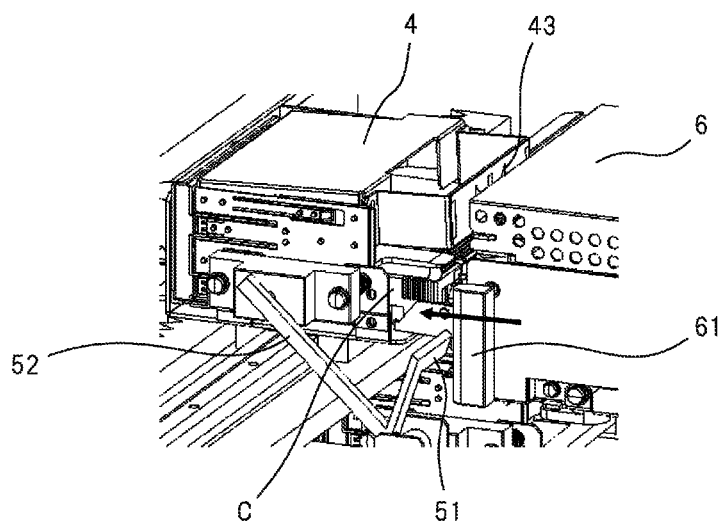
FIG. 17 is a perspective view which illustrates the operation of the hand mechanism in a certain cabinet transferring a carried medium to a moving member.
Figure 18:
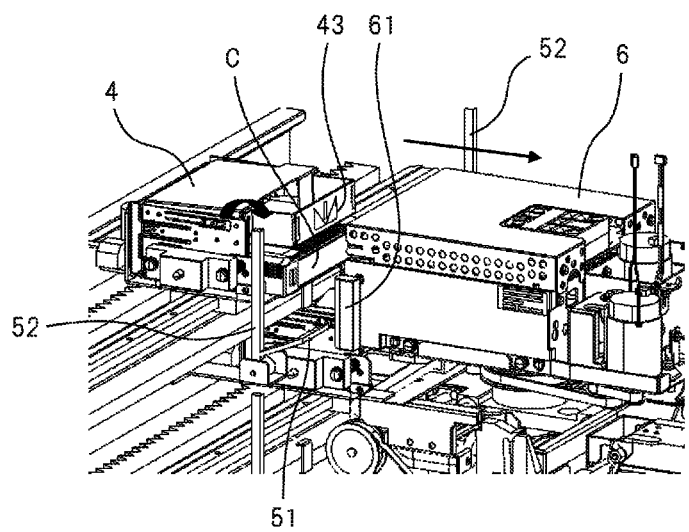
FIG. 18 is a perspective view which illustrates the operation of the hand mechanism in a certain cabinet moving and releasing a stopper after transferring the carried medium to the moving member.

At step 107, as illustrated in FIG. 16, the hand mechanism 6 reads the flag 43 which is displayed at the surface at the hand mechanism 6 side of the moving member 4 and moves the cartridge to the position for transfer to the moving member 4 on the left/right direction movement mechanism 21. The flag 43 is read by a reading device 62 which is attached to the hand mechanism 6. For the reading device 62, a CCD (Charge Coupled Device) may be used. The amount of movement of the hand mechanism 6 at this time is slight, so the stopper 52 remains knocked down by the engaging part 61. If the hand mechanism 6 finishes moving, as illustrated in FIG. 17, the cartridge C which had been carried by the hand mechanism 6 is made to move in the arrow direction and the cartridge C is transferred to the moving member 4. After this, as illustrated in FIG. 18, the hand mechanism 6 retracts in the direction which is illustrated by the arrow, returns the stopper 52 which was knocked down by the engaging part 61 to its original position, and disengages the moving member 4 from the stopper 52. Note that, this disengagement of the moving member 4 from the stopper 52 may also be performed after the destination cabinet of the moving member 4 is ready to receive the moving member 4.

Figure 19:
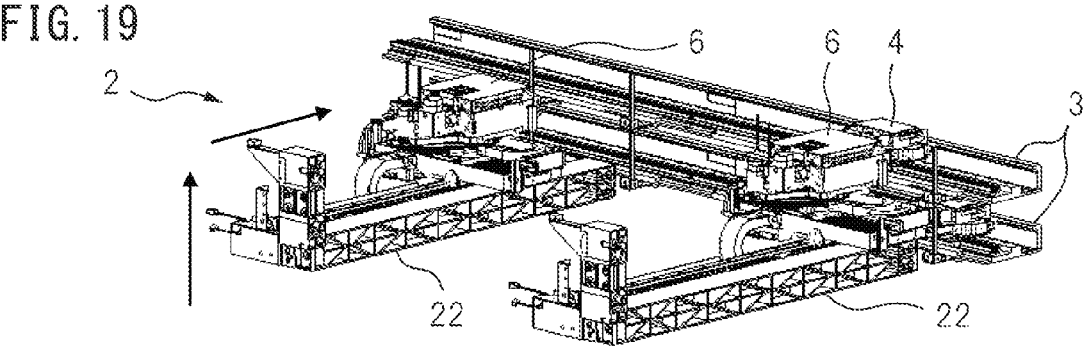
FIG. 19 is a perspective view which illustrates the operation of the hand mechanism of a destination cabinet of a medium approaching a housing-to-housing medium conveying track member by a magnetic recording medium conveyance robot.

At step 108, in the destination cabinet of the cartridge, as illustrated in FIG. 19, the robot 2 is used to make the hand mechanism 6 move in the X-, Y-, and Z-directions whereby it approaches the housing-to-housing medium conveying track member 3. In the state which is illustrated in FIG. 19, the moving member 4 which carries a cartridge is still engaged by the stopper.

Figure 20:
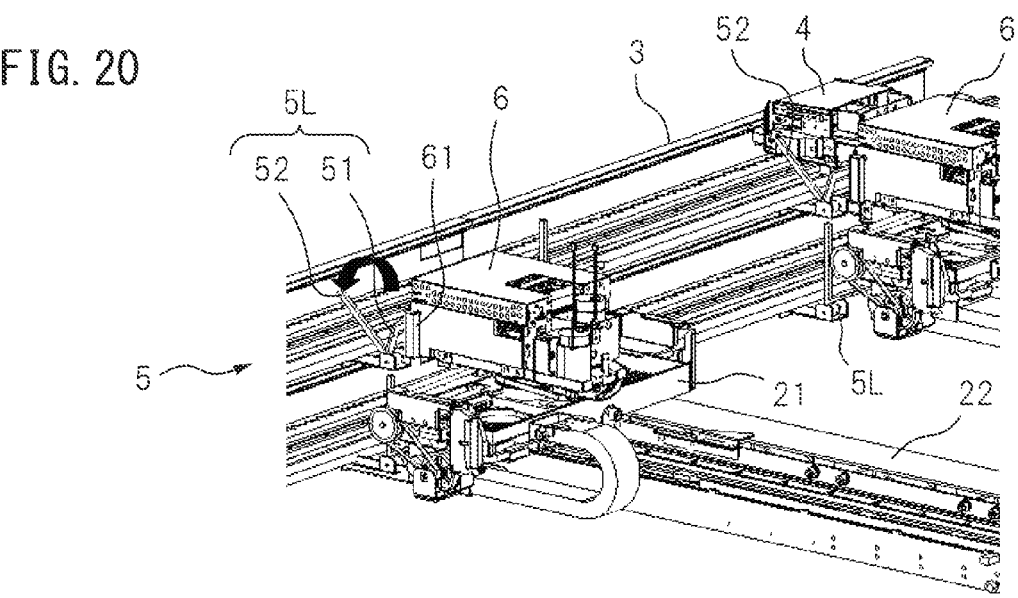
FIG. 20 is a perspective view which illustrates the operation of the hand mechanism of the destination cabinet of a medium being moved by a magnetic recording medium conveyance robot and knocking over a stopper.

At step 109, as illustrated in FIG. 20, in accordance with the position of the moving member 4 on the track member 3, the hand mechanism 6 of the destination cabinet of the cartridge knocks over one of the two stoppers 5 which are provided at the track member 3. In the state which is illustrated in FIG. 20, the moving member 4 is on the track member 3 at the right side of the destination cabinet, so the hand mechanism 6 pushes the receiving part 51 of the left side stopping mechanism 5L by the engaging part 61 and knocks over the stopper 52 in the direction illustrated by the arrow. Even in the state which is illustrated in FIG. 20, the moving member 4 which carries a cartridge is still in a state engaged by the stopper 52.

Figure 21:
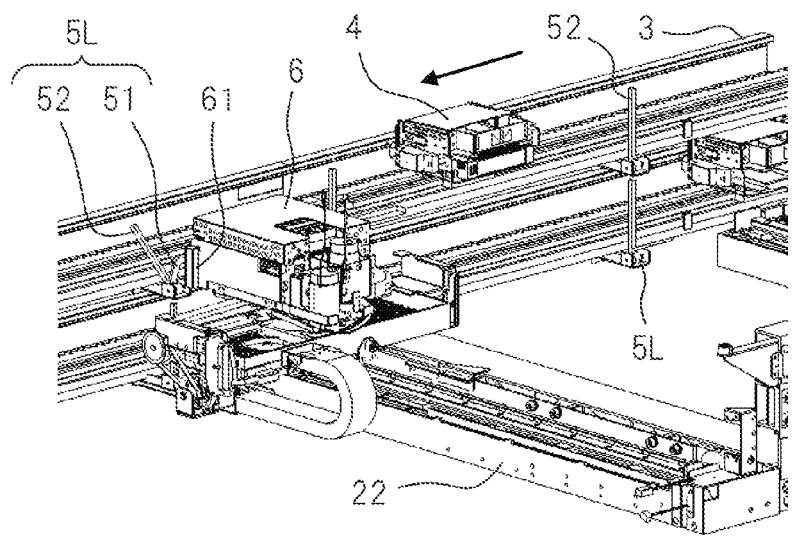
FIG. 21 is a perspective view which illustrates the operation of a moving member which carries a medium moving on a housing-to-housing medium conveying track member from a certain cabinet toward a destination cabinet of the medium.
Figure 22:
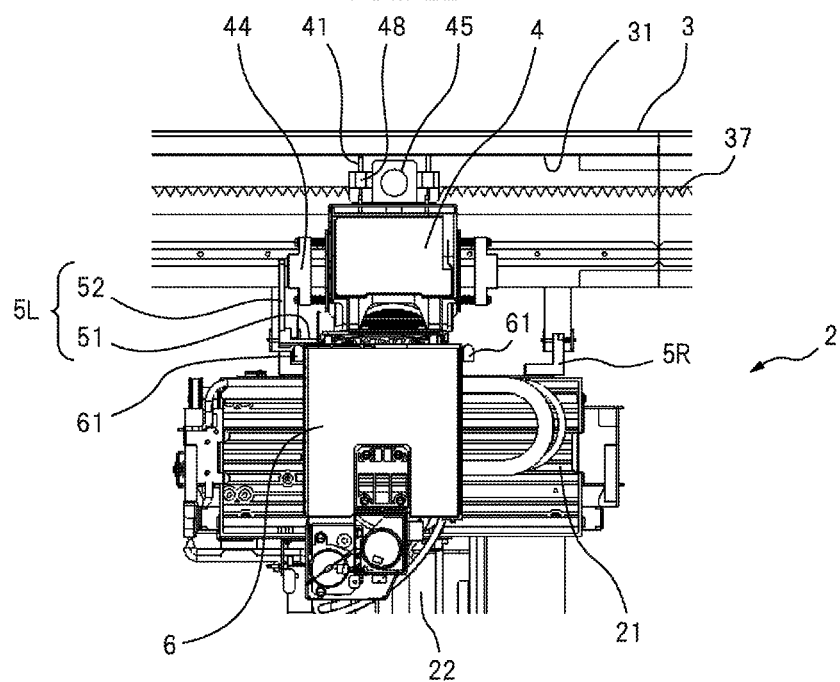
FIG. 22 is a perspective view which illustrates the state of a moving member which moves on a housing-to-housing medium conveying track member approaching the hand mechanism of the destination cabinet of a medium and abutting against a stopper.

Step 110 is executed from the state which is illustrated in FIG. 20 after the stopper 52 which is engaged with the moving member 4 which carries a cartridge is released. At step 110, as illustrated in FIG. 21, the moving member 4 which carries a cartridge arrives after moving on the track member 3. Further, as illustrated in FIG. 22, when the moving member 4 abuts against the stopper 52, movement of the moving member 4 stops. The stopping operation of the moving member 4 is explained at step 106 and FIG. 15, so the same members are assigned the same reference notations and explanations are omitted.

Figure 23:
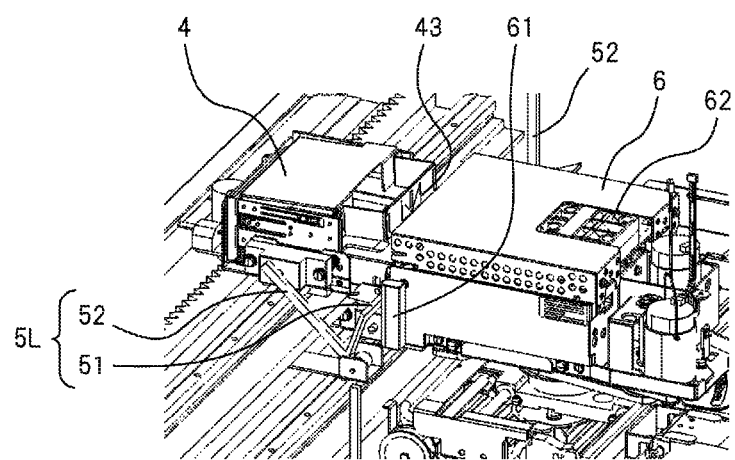
FIG. 23 is a perspective view which illustrates the state of a hand mechanism of the destination cabinet of a medium reading a flag during movement and moving to a transfer position of the medium with a moving member.
Figure 24:
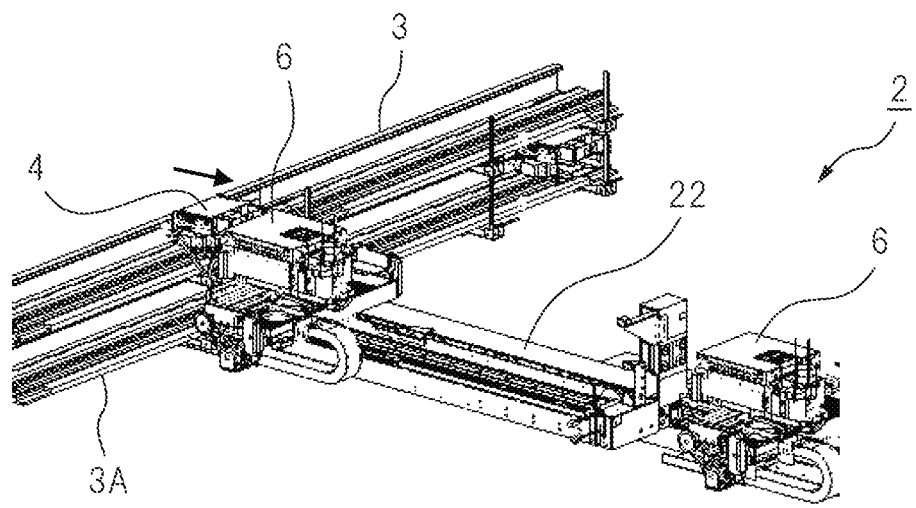
FIG. 24 is a perspective view which illustrates the operation of the hand mechanism in a destination cabinet of a medium picking up the medium which is carried at the moving member.

At step 111, as illustrated in FIG. 23, the reading device 62 which is provided at the hand mechanism 6 of the destination cabinet reads the flag 43 of the moving member 4 and the hand mechanism 6 moves to the transfer position of the cartridge with the moving member 4. After this, as illustrated in FIG. 24, the cartridge is taken in from the moving member 4 to the hand mechanism 6 as illustrated by the arrow. The other hand mechanism 6 which is illustrated in FIG. 24 is a hand mechanism 6 at a separate cabinet.

Figure 25:
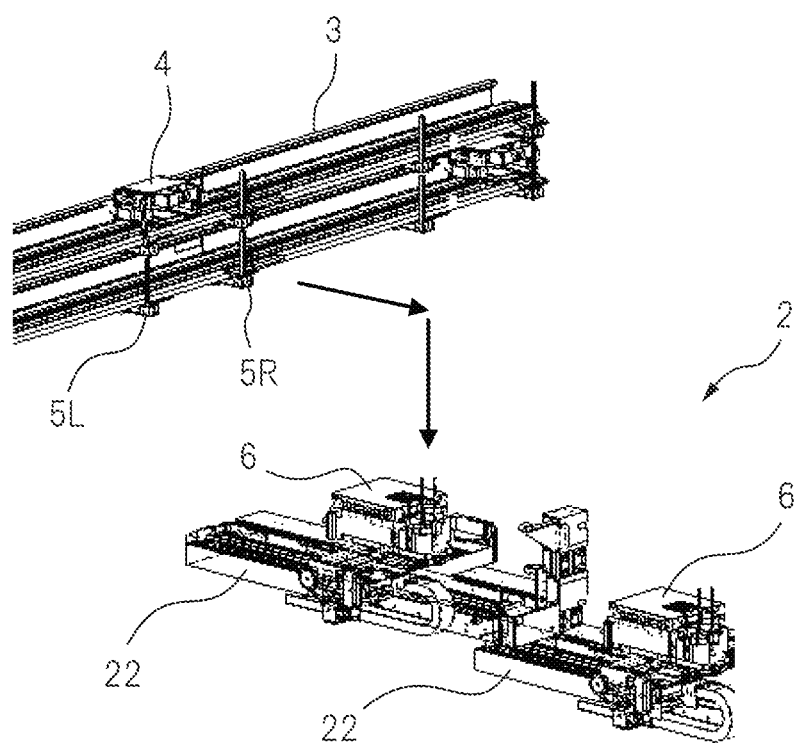
FIG. 25 is a perspective view which illustrates the operation of moving a hand mechanism of the destination cabinet of a medium by a magnetic recording medium conveyance robot and inserting the medium which the hand mechanism picks up at a location which is designated by a host server.

At the destination cabinet, if the cartridge is fetched from the moving member 4 to the hand mechanism 6, step 112 is performed. At step 112, as illustrated in FIG. 25, the robot 2 of the destination cabinet moves the hand mechanism 6 in the X-, Y-, and Z-directions to insert the cartridge in the designated medium storage rack or insert the cartridge in the drive in the destination cabinet.

Step 113 judges if the instruction from the host server has been completed. When there is no movement instruction of a cartridge from a host server (YES), this routine is ended. On the other hand, when there is a movement instruction of a cartridge from a host server (NO), the routine returns to step 101 where the processing from step 101 to step 113 is repeated.

In the library apparatus in the embodiment which was explained above, the moving member which moves between a plurality of library apparatus which are linked by a track member while carrying a cartridge can stop at a predetermined position by a mechanical mechanism. For this reason, the configuration of the library apparatus can be simplified. That is, the library apparatus of the above explained embodiment enables realization of a large capacity tape library apparatus by aligning identical specification library apparatuses in parallel and providing a cartridge conveyance mechanism at the back parts of the apparatuses instead of cartridge storage racks. Since the functions of existing tape library apparatuses can be used, the cartridge conveyance mechanism can be built around a mechanical mechanism. Since the drive motor also does not perform servo control etc., it can be built by an inexpensive DC motor. Furthermore, the control cables are only the cables which feed power to the cartridge conveyance mechanism. The conveyance mechanism is built without cables so it is possible to provide an apparatus which reduces the work hours for expansion, can reduce the power consumption, and is environmentally friendly.

Note that, by applying the present application to existing library apparatuses, it is possible to realize a large capacity tape library with a number of stored tape cartridges eight times or so larger than current library apparatuses and possible to assist the long term storage of large amounts of data in the R&D field and important national fields. Further, as recording media, it is possible to use not only tape cartridges, but also hard disks, IC memories, etc.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

What is claimed is:

1. A stand-alone library apparatus comprising:
a cabinet having an operating part on its front panel,
a first storage rack which is set at a back panel side of said cabinet and a second and a third storage racks which are set at the left and right side panel side of said cabinet for storing a plurality of recording media,
a recording/reproduction device of said recording media,
a robot which makes said recording media move between said storage racks and said recording/reproduction device,
a provisional storage rack which is provided at one level part of said first storage rack and which can be detached from said first storage rack,
two opening parts equal in cross-sectional shape to said provisional storage rack which are provided at side surfaces of said cabinet which are positioned at the two sides of said provisional storage rack, and
detachable lids which cover said opening parts being provided at the side surfaces of the cabinet,
a conveyer device including two track members each having a length equal to a length between said opening parts and replaceable with said provisional storage rack and a moving member which is able to hold and convey a cartridge on said track members:
wherein another library apparatus of a substantially identical specification can be aligned at either side of said library apparatus in parallel after detaching said lids which are facing each other, exchanging said provisional storage racks for said track members with said moving member on one of them and connecting said track members to increase a capacity thereof.

2. The library apparatus according to claim 1, wherein said conveyor device is provided with a track member and a moving member which carries said recording medium and moves along a long direction of said track member, said track member installed in said library apparatus is able to be linked with said track member in another library apparatus of the same specification passing through said opening parts.

3. The library apparatus according to claim 2, wherein said conveyor device is further provided with
a drive device which makes said moving member move along a long direction of said track member,
power feed members which are provided at said track member and which feed power to said drive device without cables, and
power acquiring members which collect current and acquire power from said power feed members.

4. The library apparatus according to claim 3, wherein said conveyor device further has
a stopping member which is placed at a stop position of said moving member and
a switch which is provided at said moving member and which cuts the feed of power to said drive device from said power acquiring members when contacting said stopping member.

5. The library apparatus according to claim 3, wherein said power feed member is comprised of a plurality of electrode plates, and
said power acquiring members are a plurality of current collectors which contact said plurality of electrode plates.

6. The library apparatus according to claim 4, wherein said power feed member is comprised of a plurality of electrode plates, and
said power acquiring members are a plurality of current collectors which contact said plurality of electrode plates.

7. The library apparatus according to claim 5, wherein in said cabinet, a robot which has a hand mechanism which grips said recording medium is provided, and
said hand mechanism has an engaging part which engages with a stopping member which is placed at a stop position of said moving member when moving to said track member side.

8. The library apparatus according to claim 7, wherein said stopping member is a lever which has a receiving part and an engaging part, when said engaging part of said hand mechanism pressing against said receiving part, said engaging part sticking out on said track member and blocking the advancing path of said moving member.

9. The library apparatus according to claim 8, wherein
said stopping member includes a left side stopping member and a right side stopping member,
a distance between said left side stopping member and said right side stopping member is larger than a horizontal width of said hand mechanism,
when said moving member is positioned inside a cabinet at a left side from the cabinet where it should stop, said engaging part which is provided at the right side of said hand mechanism causes said right side stopping member to operate, and
when said moving member is positioned inside a cabinet at a right side from the cabinet where it should stop, said engaging part which is provided at the left side of said hand mechanism causes said left side stopping member to operate.

10. The library apparatus according to claim 9, wherein
said moving member is provided with a mark which indicates a removal/storage position of said recording medium, and
said hand mechanism uses said mark as the basis for positioning at the storage/removal position of said recording medium.

11. The library apparatus according to claim 5, wherein said plurality of electrode plates are provided at positions on said track member which do not overlap when viewed from a plan view.

12. The library apparatus according to claim 10, wherein said plurality of electrode plates are provided at positions on said track member which do not overlap when viewed from a plan view.

13. The library apparatus according to claim 7, wherein said moving member stops inside the cabinet where removal/storage of said recording medium is required while matched in position with said hand mechanism.

14. The library apparatus according to claim 1, wherein said provisional storage rack is formed with a height which is the same as or higher than the height of the space to be occupied by said conveyor device and is provided at least at a plurality of racks at positions of different heights in said cabinet.

15. The library apparatus according to claim 11, wherein said provisional storage rack is formed with a height which is the same as or higher than the height of the space to be occupied by said conveyor device and is provided at least at a plurality of racks at positions of different heights in said cabinet.

16. The library apparatus according to claim 2, wherein
on said track member, a sensor which detects a position of said moving member is provided, and
a control device to which a signal from said sensor is input is used to detect a position of said moving member on said track member.

17. The library apparatus according to claim 2, wherein
on said track member, a sensor which detects a position of said moving member is provided, and
a control device to which a signal from said sensor is input is used to detect a position of said moving member on said track member.

18. A conveyor device which is used for a library apparatus according to claim 1, provided with:
a track member which is provided passing through said opening parts,
a moving member which carries said recording medium,
a drive device which makes said moving member move along a long direction of said track member,
power feed members which are provided at said track member and which feed power to said drive device, and
power acquiring members which collect current and acquire power from said power feed members.

19. A library system which is comprised of a plurality of library apparatuses according to claim 1 with cabinets which are linked by said conveyor device.

* * * * *